United States Patent [19]

Hawkins et al.

[11] Patent Number: 5,214,118
[45] Date of Patent: May 25, 1993

[54] PROCESS FOR SYNTHESIS OF POLYESTERCARBONATE-SILOXANE COPOLYMERS

[75] Inventors: Christopher M. Hawkins, Schenectady, N.Y.; Niles R. Rosenquist, Evansville, Ind.

[73] Assignee: General Electric Company, Pittsfield, Mass.

[21] Appl. No.: 593,165

[22] Filed: Oct. 5, 1990

[51] Int. Cl.$^5$ .................. C08G 77/445; C08G 77/448
[52] U.S. Cl. ...................................... 528/26; 528/29; 528/41
[58] Field of Search ............... 525/464; 528/26, 29, 528/41

[56] References Cited

U.S. PATENT DOCUMENTS

| | | | |
|---|---|---|---|
| 3,419,634 | 12/1968 | Vaughn | 528/29 |
| 3,419,635 | 12/1968 | Vaughn | 528/29 |
| 4,681,922 | 7/1987 | Schmidt et al. | 525/474 |
| 4,732,949 | 3/1988 | Paul et al. | 525/464 |
| 4,916,194 | 4/1990 | Policastro et al. | 525/433 |
| 4,920,183 | 4/1990 | Evan et al. | 525/464 |
| 4,945,147 | 7/1990 | Policastro et al. | 528/26 |
| 4,945,148 | 7/1990 | Rich et al. | 528/26 |
| 4,994,532 | 2/1991 | Hawkins | 525/464 |

FOREIGN PATENT DOCUMENTS

| | | | |
|---|---|---|---|
| 449078 | 3/1973 | U.S.S.R. | 528/29 |
| 529183 | 10/1974 | U.S.S.R. | 528/29 |
| 604855 | 4/1978 | U.S.S.R. | 528/29 |
| 1219601 | 3/1986 | U.S.S.R. | 528/29 |

*Primary Examiner*—Ralph H. Dean, Jr.

[57] ABSTRACT

A process for synthesizing polyestercarbonate-siloxane copolymers which have a smaller concentration of low molecular weight species and greater thermal stability has been described. Essentially the process includes adding the comonomer, diacid chloride siloxane, after approximately ⅓ of the phosgene has been added, in a conventional interfacial copolymerization, (as opposed to addition at the beginning of the polymerization).

6 Claims, No Drawings

PROCESS FOR SYNTHESIS OF POLYESTERCARBONATE-SILOXANE COPOLYMERS

BACKGROUND OF THE INVENTION

1. Field of the Invention

The invention relates to polyestercarbonate-siloxane copolymers and improved methods of their preparation.

2. Brief Description of the Prior Art

Polyestercarbonate-siloxane copolymers are well known polymer resins useful in a wide variety of applications; see for example the disclosures of U.S. Pat. Nos. 4,123,588 (Molari J.) and 4,569,970 (Paul et al).

The polyestercarbonate-siloxane copolymers are generally prepared on a commercial scale by copolymerization of monomeric precursors. In doing so, the carbonate precursors and the siloxane monomers are all charged to the reaction vessel and random copolymerization is effected; see for example U.S. Pat. No. 3,419,634 (Vaughn Jr.).

We have found that when an ordered copolymerization is carried out, in a step-wise sequence, the product copolymer resin is different in-kind, exhibiting enhanced thermal stability and contains a smaller concentration of low molecular weight species. The practical advantage of obtaining a resin with a smaller concentration of low molecular weight species is found in its processability. The resin, when thermally processed such as in molding operations exhibits a reduced "plate-out". The term "plate-out" as used herein refers to a phenomenon which often occurs during thermal processing of a polyestercarbonate-siloxane copolymer thermoplastic resin. The higher volatility of low molecular weight species associated with the copolymer causes them to "plate out" during thermal processing onto the molds and processing equipment, i.e., they condense on the surface of the molds, the processing equipment and also onto the surface of the molded article itself. The latter may affect quality of the molded article.

SUMMARY OF THE INVENTION

The invention comprises a process of preparing a polyestercarbonate-siloxane copolymer, which comprises;

reacting a dihydric phenol with a carbonyl halide under interfacial polymerization conditions until about 5 to 50 weight percent of the phenol to be incorporated in the copolymer has been polymerized;

adding to the resulting reaction mixture a siloxane of the formula:

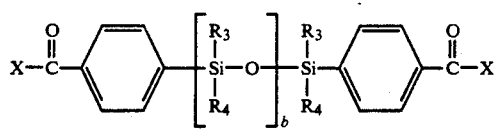

wherein b, $R_3$ and $R_4$ are each independently selected from hydrogen, hydrocarbyl and halogen-substituted hydrocarbyl; b is a whole number integer of from 1 to 50; and X represents halogen; and continuing the polymerization until there is obtained a polyestercarbonate-siloxane copolymer having repeating or recurring polycarbonate chain units of the formula:

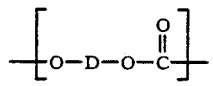

wherein D is a divalent aromatic radical of the dihydric phenol employed in the polymerization reaction; and repeating or recurring carboxylate units of the formula:

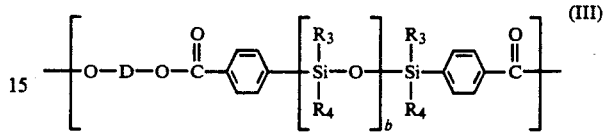

wherein b, $R_3$ and $R_4$ have the meanings previously ascribed to them.

The invention also comprises the polyestercarbonate-siloxane copolymers prepared by the method of the invention. These copolymers are useful as thermoplastic molding compositions. Articles molded from the compositions generally exhibit a higher degree of thermal stability.

The term "hydrocarbyl" as used herein means the monovalent moiety obtained upon removal of a hydrogen atom from a parent hydrocarbon. Representative of hydrocarbyl are alkyl of 1 to 12 carbon atoms, inclusive, such as methyl, ethyl, propyl, butyl, pentyl, hexyl, heptyl, octyl, nonyl, undecyl, decyl, dodecyl and the isomeric forms thereof; cycloalkyl of 3 to 8 carbon atoms, inclusive, such as cyclopropyl, cyclobutyl, cyclopentyl, cyclohexyl, cycloheptyl, cyclooctyl and the like; alkyl substituted cycloalkyl of 4 to 12 carbon atoms, inclusive, such as 2-methylcyclopropyl, 3,4-dimethylcyclohexyl; alkenyl of 2 to 12 carbon atoms, inclusive, such as vinyl, allyl, butenyl, pentenyl, hexenyl, octenyl, nonenyl, decenyl, undecenyl, dodecenyl; aryl of 6 to 10 carbon atoms such as phenyl, naphthyl; aralkyl of 7 to 10 carbon atoms, inclusive, such as benzyl, phenethyl, phenpropyl, phenbutyl and the like; alkaryl of 7 to 10 carbon atoms, inclusive, such as methylphenyl, ethylphenyl, propylphenyl, butylphenyl and the like.

The term "halogen" is used herein in its normal sense as embracive of chlorine, bromine and iodine.

The term "halogen substituted hydrocarbyl" as used herein means hydrocarbyl as defined above wherein one or more hydrogen atoms have been replaced with a halogen atom.

DETAILED DESCRIPTION OF THE PREFERRED EMBODIMENTS OF THE INVENTION

The process for preparing polyestercarbonate-siloxane copolymers of the invention employs the same general technique used in the preparation of copolyestercarbonates, using interfacial polymerization conditions. This technique is well known to those skilled in the art; see for example the U.S. Pat. Nos. 3,169,121 and 4,487,896 which are incorporated herein by reference thereto.

In general, the method of interfacial polymerization comprises the reaction of a dihydric phenol with a carbonyl halide (the carbonate precursor).

Although the reaction conditions of the preparative processes may vary, several of the preferred processes typically involve dissolving or dispersing the diphenol reactants in aqueous caustic, adding the resulting mixture to a suitable water immiscible solvent medium and contacting the reactants with the carbonate precursor, such as phosgene, in the presence of a suitable catalyst and under controlled pH conditions. The most commonly used water immiscible solvents include methylene chloride, 1,2-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process comprises a phosgenation reaction. The temperature at which the phosgenation reaction proceeds may vary from below 0° C., to above 100° C. The phosgenation reaction preferably proceeds at temperatures of from room temperature (25° C.) to 50° C. Since the reaction is exothermic, the rate of phosgene addition may be used to control the reaction temperature. The amount of phosgene required will generally depend upon the amount of the dihydric phenols.

The dihydric phenols employed are known, and the reactive groups are the two phenolic hydroxyl groups. Some of the dihydric phenols are represented by the general formula:

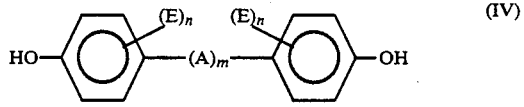

(IV)

wherein A is a divalent hydrocarbon radical containing from 1 to about 15 carbon atoms; a substituted divalent hydrocarbon radical containing from 1 to about 15 carbon atoms and substituent groups such as halogen; —S—; —SS—; —S(O)—; —S(O)$_2$—; —O—; each E is independently selected from the group consisting of hydrogen, halogen, and a monovalent hydrocarbon radical such as an alkyl group of from 6-18 carbon atoms, an aralkyl group of from 7 to about 14 carbon atoms, an alkaryl group of from 7 to about 14 carbon atoms, an alkoxy group of from 1 to about 8 carbon atoms; and m is zero or 1 and n is an integer of from 0 to 4.

Typical of some of the dihydric phenols employed are bis-phenols such as bis(4-hydroxyphenyl)methane, 2,2-bis(4-hydroxyphenyl)propane (also known as bisphenol-A), 2,2-bis(4,hydroxy-3,5-dibromophenyl)-propane; dihydric phenol ethers such as bis(4-hydroxy-phenyl) ether, bis(3,5-dichloro-4-hydroxyphenyl) ether; dihydroxybiphenyls such as p,p'-dihydroxybiphenyl, 3,3'-dichloro-4,4'-dihydroxybiphenyl; dihydroxyaryl sulfones such as bis(4-hydroxyphenyl) sulfone, bis (3,5-dimethyl-4-hydroxyphenyl) sulfone, dihydroxybenzenes such as resorcinol and hydroquinone; halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl) sulfide, bis(4-hydroxyphenyl) sulfoxide and bis(3,5-dibromo-4-hydroxyphenyl) sulfoxide. A variety and are disclosed in U.S. Pat. Nos. 2,999,835; 3,028,365 and 3,153,008; all of which are incorporated herein by reference. It is, of course, possible to employ two or more different dihydric phenols or a combination of a dihydric phenol with glycol.

The carbonate precursor can be either a carbonyl halide, a diarylcarbonate or a bishaloformate. The carbonyl halides include carbonyl bromide, carbonyl chloride, and mixtures thereof. The bishaloformates include the bishaloformates of dihydric phenols such as bischloroformates of 2,2-bis(4-hydroxyphenyl)-propane, 2,2-bis(4,hydroxy-3,5-dichlorophenyl)-propane, hydroquinone, and the like, or bishaloformates of glycols such as bishaloformates of ethylene glycol, and the like. While all of the above carbonate precursors are useful, carbonyl chloride, also known as phosgene, is preferred.

A suitable acid acceptor present in the reaction mixture may be either organic or inorganic in nature. Representative of an organic acid acceptor is a tertiary amine such as pyridine, triethylamine, dimethylaniline, tributylamine, etc. An inorganic acid acceptor may be one which can be either a hydroxide, a carbonate, a bicarbonate, or a phosphate or an alkali or alkaline earth metal hydroxide.

Also included within the scope of the present invention are the high molecular weight thermoplastic randomly branched polyestercarbonate-siloxane copolymers. These randomly branched resins are prepared by coreacting a polyfunctional organic compound with the aforedescribed dihydric phenols and carbonate precursor. The polyfunctional organic compounds useful in making the branched resins are set forth in U.S. Pat. Nos. 3,635,895 and 4,001,184 which are incorporated herein by reference. These polyfunctional compounds are generally aromatic and contain at least three functional groups which are carboxyl, carboxylic anhydrides, phenols, haloformyls or mixtures thereof. Some nonlimiting examples of these polyfunctional aromatic compounds include 1,1,1-tri(4-hydroxyphenyl) ethane, trimellitic anhydride, trimellitic acid, trimellitoyl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are 1,1,1-tri(4-hydroxyphenyl)ethane, trimellitic anhydride or trimellitic acid or their haloformyl derivatives.

The polyestercarbonate-siloxane resin products of the process of the invention may be of relatively low weight average molecular weight or of relatively high weight average molecular weight ($M_w$). The low $M_w$ resins are generally end-capped.

The so-called "end-capped" resins are prepared by the above-described procedures of producing polyestercarbonate-siloxane polymers, wherein the reaction mixture includes small amounts of molecular weight regulators or chain terminators to provide end or terminal groups on the polymer and thereby control the molecular weight of the product resin.

A molecular weight regulator, i.e.; a chain stopper, is generally added to the reactants prior to or during the contacting of them with the carbonate precursor. Useful molecular weight regulators include, but are not limited to, monohydric phenols such as phenol, chroman-I, paratertiarybutylphenol, and the like.

In the prior art preparation of copolyester-carbonates by interfacial polymerization technique there is also included as a reactant a dicarboxylic acid or reactive derivative such as the acid halide (ester precursor) in the water-immiscible solvent, see for example U.S. Pat. No. 3,169,121.

The process of the present invention departs from the general procedure for the preparation of copolyestercarbonates as generally outlined above, by replacing the dicarboxylic acid as the ester precursor with a diacid halide of the formula (I) given above. The diacid halides (I) are well known compounds as are methods of their preparation; see for example the method of D. W. Lewis & G. C. Gainer, J. Amer. Chem Soc. Vol. 74, 2931 (1952). Preferred compounds of the formula (I) are those wherein X represents chlorine and $R_3$ and $R_4$ represent hydrogen or alkyl.

Illustrative of the compounds of formula (I) are diphenyldisiloxane-4,4' dicarboxylic acid chloride and the like.

The proportions of reactants employed to prepare the polyestercarbonate-siloxane resins will vary in accordance with their proposed use. Those skilled in the art are aware of useful proportions, as described in the U.S. patents referred to above. In general, the amount of the ester bonds may be from about 0.5 to about 90 mole percent, relative to the carbonate bonds. For example, 5 moles of bisphenol A reacting completely with 4 moles of diacid and 1 mole of phosgene would give a polyestercarbonate-siloxane copolymer of 80 mole percent ester bonds.

The thermoplastic resins of the invention may also be compounded with conventional molding aids such as, for example, antioxidants; antistatic agents; inert fillers such as glass, talc, mica, and clay; ultraviolet radiation absorbers such as the benzophenones, benzotriazoles, and the like; hydrolytic stabilizers such as the epoxides disclosed in U.S. Pat. Nos. 3,489,716, 4,138,379 and 3,839,247, all of which are incorporated hereby by reference; color stabilizers such as the organophosphites; thermal stabilizers such as phosphite; mold release agents and flame retardants. Some particularly useful flame retardants are the alkali and alkaline earth metal salts of sulfonic acids. These types of flame retardants are disclosed in U.S. Pat. Nos. 3,933,734; 3,931,100; 3,978,024; 3,948,851; 3,926,980; 3,919,167; 3,909,490; 3,953,396; 3,953,300; 3,917,559; 3,951,910 and 3,940,366, all of which are hereby incorporated herein by reference.

The following examples describe the manner and process of making and using the invention and set forth the best mode contemplated by the inventors for carrying out the invention but is not to be construed as limiting. In carrying out the examples, the following tests were employed:

INTRINSIC VISCOSITY

The intrinsic viscosity (IV) of polyestercarbonate-siloxane resins may be determined in methylene chloride at a temperature of 25° C., and is reported in deciliters/gm.

Kasha Index (KI)

The procedure for determining the Kasha Index is as follows: 7 grams of resin pellets, dried a minimum if 90 minutes at 125° C. are added to a modified Tinius-Olsen T3 melt indexer; the temperature in the indexer is maintained at 300° C. and the resin is heated at this temperature for 6 minutes; after 6 minutes the resin is forced through a 1.05 mm radius orifice using a plunger of radius 4.7 mm and an applied force of 7.7 kgs; the time required for the plunger to travel 5.1 cm is measured in centiseconds and this is reported as the Kasha Index (KI). The higher the KI the higher the melt viscosity of the resin and the more viscous the resin and, therefore, the more difficult to process.

EXAMPLE 1 (CONTROL)

This example is not an example of the invention, but is made for comparative purposes and represents a prior art preparation of a polycarbonate control.

A reactor was charged with 35 L methylene chloride, 30 L water, 25 lbs. of bisphenol A, 70 mL triethylamine, 17.5 g sodium gluconate, and 343.4 g p-cumylphenol. Phosgene was added at 120 g/min for 45 minutes with pH being controlled at 10.5-11.0 by addition of aqueous sodium hydroxide. After washing with dilute HCl and water and steam precipitation, the polymer was recovered. An injection-molded sample was prepared and tested. The test result is shown in the TABLE, below.

EXAMPLE 2 (CONTROL)

Polyestercarbonate siloxane resin made by a prior process, diphenyldisiloxane-4,4'-dicarboxylic acid chloride (DPSDAC) being added at the beginning of the reaction for comparative purposes.

A reactor was charged with 35 L methylene chloride, 30 L water, 25 lbs. of bisphenol-A, 70 mL triethylamine, 17.5 g sodium gluconate, and 343.4 g p-cumylphenol. 820 g of DPSDAC in 2 L of methylene chloride was added over 6 minutes with pH being controlled at 10.5-11.0 by addition of aqueous sodium hydroxide. Phosgene was then added at 120 g/min with pH being controlled at pH 10.5-11.0 for 45 minutes. After washing with dilute HCl and water and steam precipitation, the polymer was recovered. Injection molded samples were tested as reported in the TABLE, below.

EXAMPLE 3

DPSDAC added after ⅓ (by weight) of the phosgene has been added.

A reactor was charged with 35 L methylene chloride, 30 L water, 25 lbs. of bisphenol A, 70 mL triethylamine, 17.5 g sodium gluconate, and 343.4 g p-cumylphenol. Phosgene was added at 120 g/min with pH being controlled at 10.5-11.0 by addition of aqueous sodium hydroxide. After 15 minutes of phosgenation, 820 g of DPSDAC in 2 L of methylene chloride was added over 6 minutes. Phosgenation continued during the addition of DACS. Phosgenation was continued for a total of 45 minutes. After washing with dilute HCl and water and steam precipitation, the polymer was recovered. Injection molded samples were tested and the test results are set forth in the TABLE, below.

TABLE

|  | Example 1 | Example 2 | Example 3 |
| --- | --- | --- | --- |
| 6 min KI | 3310 | 6350 | 7250 |
| Part KI | 2790 | 4810 | 6440 |
| % KI drop | 15.7 | 24.3 | 11.2 |

The gel permeation chromatographic (GPC) traces of the resins clearly show that the process dramatically reduces the concentration of the low molecular weight species. These low molecular weight species are known to be deleterious to polycarbonate resin as they "plate out" on molds, causing sticking and surface defects. The GPC analyses shows the presence of low molecular weight species in the products of Example 2, and a substantial absence of such material in the product of Examples 1 and 3.

The DPSDAC is a compound of the formula (I) given above wherein b is 1, $R_3$ and $R_4$ are each methyl and X is chlorine.

What is claimed is:

1. A process of preparing a polyester-carbonate-siloxane copolymer, which comprises;

reacting a dihydric phenol with a carbonyl halide under interfacial polymerization conditions until about 5 to 50 weight percent of the phenol to be incorporated in the copolymer has been polymerized;

adding to the reaction mixture a siloxane of the formula:

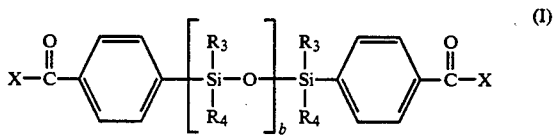

wherein $R_3$ and $R_4$ are each independently selected from hydrogen, hydrocarbyl or halogen-substituted hydrocarbyl; b is a whole number integer of from 0 to 50; and X represents halogen; and continuing the polymerization until there is obtained a polyester-carbonate-siloxane copolymer having repeating or recurring polycarbonate chain units of the formula:

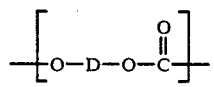

wherein D is a divalent aromatic radical of the dihydric phenol employed in the polymerization reaction, and repeating or recurring carboxylate units of the formula:

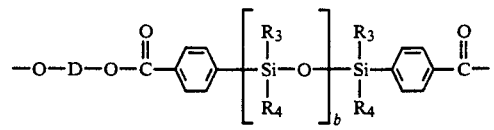

wherein b, $R_3$ and $R_4$ have the meanings previously ascribed to them.

2. The process of claim 1 wherein the dihydric phenol is selected from those of the formula:

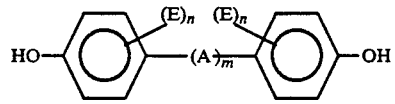

wherein A is a divalent hydrocarbon radical containing from 1 to about 15 carbon atoms; a substituted divalent hydrocarbon radical containing from 1 to about 15 carbon atoms and said substituent on the divalent hydrocarbon is selected from the group consisting of halogen; —S—; —SS—; —S(O)—; —S(O)$_2$—; or —O—; each E is independently selected from the group consisting of halogen, an alkoxy group of from 1 to about 8 carbon atoms, and a monovalent hydrocarbon radical selected from the group consisting of an alkyl group of from 6–18 carbon atoms, an aralkyl group of from 7 to about 14 carbon atoms, an alkaryl group of from 7 to about 14 carbon atoms; and m is zero or 1 and n is an integer of from 0 to 4.

3. The process of claim 2 wherein the dihydric phenol is bisphenol A.

4. The process of claim 3 wherein the carbonyl halide is phosgene.

5. The process of claim 4 wherein the siloxane is diphenyldisiloxane-4,4' dicarboxylic acid chloride.

6. The process of claim 4 wherein about one-third of the phosgene is reacted before adding the siloxane.

* * * * *